United States Patent
Tavernese et al.

(10) Patent No.: US 10,082,252 B2
(45) Date of Patent: Sep. 25, 2018

(54) LED SIGNAL MODULE WITH LIGHT-ABSORBING TEXTURED PATTERN

(71) Applicant: GE Lighting Solutions, LLC, East Cleveland, OH (US)

(72) Inventors: Luigi Tavernese, Lachine, QC (CA); Lucas Urtiga, Lachine, QC (CA); Christian Auger, Lachine, QC (CA); Eden Dubuc, Lachine, QC (CA); Yu Felix Fan, Lachine, QC (CA)

(73) Assignee: GE Lighting Solutions, LLC, East Cleveland, OH (US)

( * ) Notice: Subject to any disclaimer, the term of this patent is extended or adjusted under 35 U.S.C. 154(b) by 244 days.

(21) Appl. No.: 14/924,755

(22) Filed: Oct. 28, 2015

(65) Prior Publication Data

US 2017/0122500 A1    May 4, 2017

(51) Int. Cl.

| | |
|---|---|
| *F21V 23/00* | (2015.01) |
| *F21K 99/00* | (2016.01) |
| *F21V 5/04* | (2006.01) |
| *F21V 17/06* | (2006.01) |
| *F21V 11/16* | (2006.01) |
| *F21W 111/02* | (2006.01) |
| *F21Y 101/02* | (2006.01) |
| *G08G 1/095* | (2006.01) |

(52) U.S. Cl.
CPC .............. *F21K 9/30* (2013.01); *F21V 5/04* (2013.01); *F21V 11/16* (2013.01); *F21V 17/06* (2013.01); *F21V 23/005* (2013.01); *F21W 2111/02* (2013.01); *F21Y 2101/02* (2013.01); *G08G 1/095* (2013.01)

(58) Field of Classification Search
CPC ............. F21Y 2103/10; F21Y 2105/10; F21V 23/005; F21V 23/004; F21V 23/008
See application file for complete search history.

(56) References Cited

U.S. PATENT DOCUMENTS

| | | | |
|---|---|---|---|
| 4,254,453 A * | 3/1981 | Mouyard | G09F 13/22 340/815.54 |
| 5,833,355 A | 11/1998 | You et al. | |
| 6,439,743 B1 | 8/2002 | Hutchinson | |
| 7,070,310 B2 * | 7/2006 | Pond | B60Q 1/04 362/516 |
| 7,101,059 B2 | 9/2006 | Blumel | |

(Continued)

FOREIGN PATENT DOCUMENTS

| | | |
|---|---|---|
| AU | 737997 B3 | 9/2001 |
| CN | 201228928 Y | 4/2009 |

(Continued)

OTHER PUBLICATIONS

European Search Report and Opinion issued in connection with corresponding EP Application No. 16196069.5 dated Mar. 31, 2017.

*Primary Examiner* — Ismael Negron
(74) *Attorney, Agent, or Firm* — Peter T. DiMauro; GE Global Patent Operation

(57) ABSTRACT

An LED signal module includes a circuit board with a plurality of LEDs, a corresponding plurality of lenses and an overmolded front element with a plurality of openings for receiving one of the plurality of lenses therethrough, and an exterior surface having a textured pattern thereon, with the front element configured to absorb the light from external sources.

15 Claims, 4 Drawing Sheets

(56) References Cited

U.S. PATENT DOCUMENTS

| | | | |
|---|---|---|---|
| 7,556,404 B2* | 7/2009 | Nawashiro | F21V 5/04 257/98 |
| 7,914,162 B1* | 3/2011 | Huang | B60L 1/14 219/220 |
| 7,985,008 B2 | 7/2011 | Kaisser et al. | |
| 8,858,024 B2* | 10/2014 | Wu | F21V 5/046 362/240 |
| 8,876,326 B1* | 11/2014 | Davis | F21V 9/04 362/231 |
| 9,097,833 B2* | 8/2015 | Suehiro | G02B 6/0085 |
| 9,109,774 B1 | 8/2015 | Winters et al. | |
| 2007/0165162 A1 | 7/2007 | Meersman et al. | |
| 2008/0220549 A1 | 9/2008 | Nall et al. | |
| 2009/0237928 A1 | 9/2009 | Dubuc | |
| 2009/0323332 A1* | 12/2009 | Lo | F21K 9/00 362/235 |
| 2015/0260376 A1* | 9/2015 | Joo | F21S 48/1159 362/235 |

FOREIGN PATENT DOCUMENTS

| | | |
|---|---|---|
| DE | 10026661 A1 | 12/2001 |
| DE | 102013215646 A1 | 2/2015 |
| JP | 2000114605 A | 4/2000 |
| WO | 2011023927 A1 | 3/2011 |

* cited by examiner

LED SIGNAL MODULE WITH LIGHT-ABSORBING TEXTURED PATTERN

TECHNICAL FIELD

The present invention relates generally to light emitting diode (LED) signal modules. In particular, the present invention relates an LED signal module, for example a traffic LED signal modules having an improved visual appearance.

BACKGROUND

An LED traffic signal typically includes a housing having a printed circuit board with a plurality of LEDs disposed thereon. A single large front cover is connected to the housing, facing the user. The front cover serves to create a light emitting surface and can act as a color filter and a lens to direct the light towards the user. The front cover also provides the outer appearance of the LED traffic signal.

Some concerns with the front cover are the undesirable effects of sun phantom where the traffic signal can appear to be in an on-state even when the traffic signal is in an off-state, due to the sun rays reflecting the traffic signal.

SUMMARY OF THE EMBODIMENTS

Embodiments of the present invention provide an LED signal module having a front-less housing to minimize the sun phantom effect.

In one exemplary embodiment, an LED signal module is provided. The LED signal module includes a circuit board including a plurality of LEDs, a plurality of lens each lens corresponding to an LED of the plurality of LEDs and a front element of an overmolded material having a plurality of openings, each opening to receive a lens therethrough, and an exterior surface having a textured pattern thereon. The front element absorbs the light from external sources.

According to another exemplary embodiment, an LED signal module is provided. The LED signal module includes a circuit board including a plurality of LEDs; a plurality of lenses, each lens corresponding to an LED of the plurality of LEDs; LED driver components mounted on the circuit board; and a front element of an overmolded material that includes a plurality of openings, each opening to receive a lens therethrough, and an exterior surface having a textured pattern thereon. The front element absorbs the light from external sources and encases the LED driver components and circuit board.

The foregoing has broadly outlined some of the aspects and features of various embodiments, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

Figure 1:
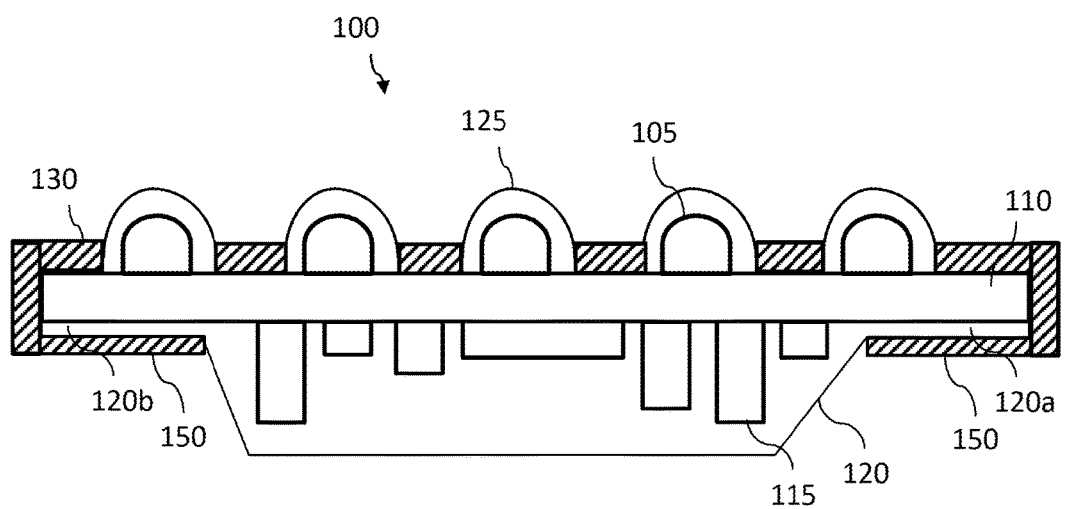
FIG. 1 is a schematic illustrating an LED signal module that can be implemented within one or more embodiments of the present invention.

The drawings are only for purposes of illustrating preferred embodiments and are not to be construed as limiting the disclosure. Given the following enabling description of the drawings, the novel aspects of the present disclosure should become evident to a person of ordinary skill in the art. This detailed description uses numerical and letter designations to refer to features in the drawings. Like or similar designations in the drawings and description have been used to refer to like or similar parts of embodiments of the invention.

DETAILED DESCRIPTION OF THE EMBODIMENTS

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Details regarding the LED signal module 100 of the present invention will now be discussed with reference to FIGS. 1-3. FIG. 1 illustrates the LED signal module 100 which can be implemented as a Traffic LED signal module. The present invention is not limited to the LED signal module 100 being used as a traffic LED signal module and therefore may be implemented within other applications.

As shown in FIG. 1, the LED signal module 100 includes a plurality of LEDs 105, a PCB 110 and LED driver components 115. As shown, the plurality of LEDs 105 are mounted on the PCB 110 and spaced a predetermined distance apart from each other. The LEDs 105 may be organic LEDS, monochromatic LEDs, or white LEDs. The LEDs 105 can be a thru-hole type or a surface-mount type or any other type of LEDs suitable for the purposes set forth herein The LED driver components 115 are disposed on a side of the PCB 110 opposite the side having the LEDs 105 mounted thereon. The LED driver components include electronic circuitry for controlling operational states of the LEDS 105. The electronic circuitry can include various components necessary for performing the operations of the LEDs 105.

According to this embodiment, the LED driver components 115 are encased by a backshell 120. The backshell 120 can be formed of a plastic material or any other suitable material.

The LED signal module 100 further includes a plurality of lenses 125, and a front element 130. Each lens 125 is formed over each LED 105 and is mounted to the PCB 110. Details regarding mounting of the lenses 125 over each LED 105 according to one embodiment will now be discussed with reference to FIG. 2.

Figure 2:
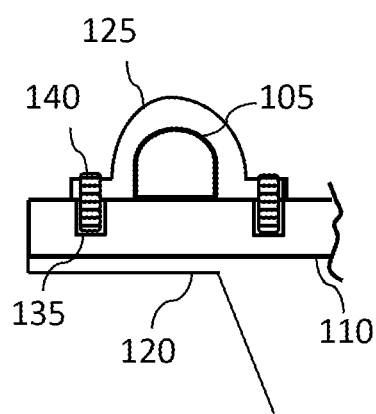
FIG. 2 is a schematic illustrating connection of a lens to the printed circuit board (PCB) of FIG. 1 that can be implemented within one or more embodiments of the present invention.

As shown in FIG. 2, the PCB 110 can further include one or more alignment holes 135 adjacent to the mounted LED 105. The lens 125 includes one or more alignment pins 140 corresponding to the alignment holes 135 formed on the PCB 110. To mount the lens 125, the respective pins 140 are fixedly inserted into the alignment holes 135. According to other embodiments, the lens 125 can be fixed in place over each LED 105 by the front element 130 (as depicted in FIGS. 1 and 3).

Figure 3:
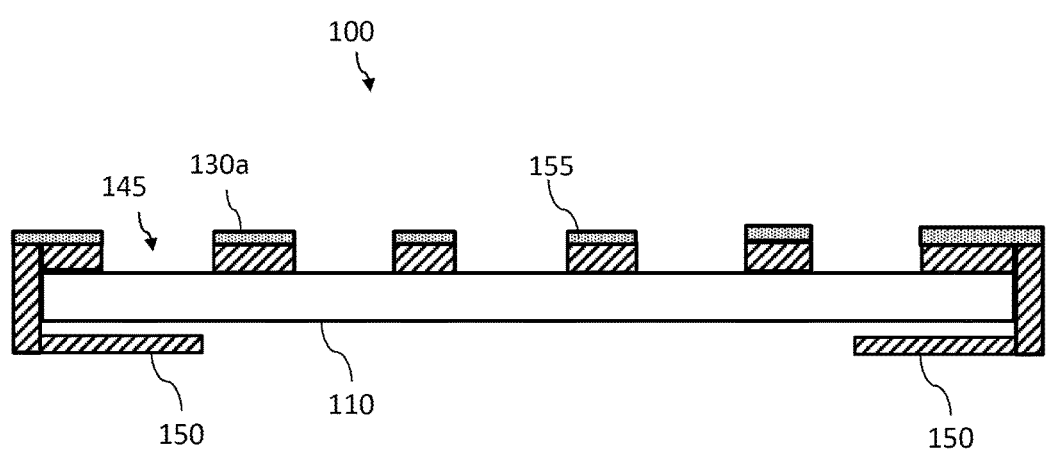
FIG. 3 is a detailed schematic of the front element of FIG. 1 that can be implemented within one or more embodiments.

Referring to FIGS. 1 and 3, the front element 130 includes a plurality of openings 145. Each opening 145 receives a top surface of the lens 125 therethrough. According to one embodiment, the front element 130 further includes L-shaped portions 150 which wraps around opposite end surfaces 120a and 120b of the backshell 120 to secure the backshell 120 to the side of the PCB 110 having the LED driver components 115 mounted thereon, by a fastening component. The fastening component can be screws, pins or any other type of attaching means. The front element 130 is not limited to any particular shape or size and can vary as needed.

Therefore, according to other embodiments, the lens 125 can be pressed fitted to the PCB 110 by the front element 130 instead of being fixedly secured by the alignment pins 140 (as depicted in FIG. 2).

As shown in FIG. 2, the front element 130 can be formed of an overmolded plastic material and includes an exterior surface 130a having a textured pattern 155 thereon, to absorb the light from external sources (e.g., the sun) to minimize the sun phantom effect, for example. The overmolded plastic material is molded at a lower temperature than that of the lens 125 material. According to embodiments, the overmolded plastic material can be a thermoplastic elastomer (TPE) or the like.

According to the embodiments, the front element 130 can be formed by bi-injection with the plurality of lenses 125. The front element 130 can also be formed of an opaque textured material to prevent overheating of the components of the LED signal module 100.

Figure 4:
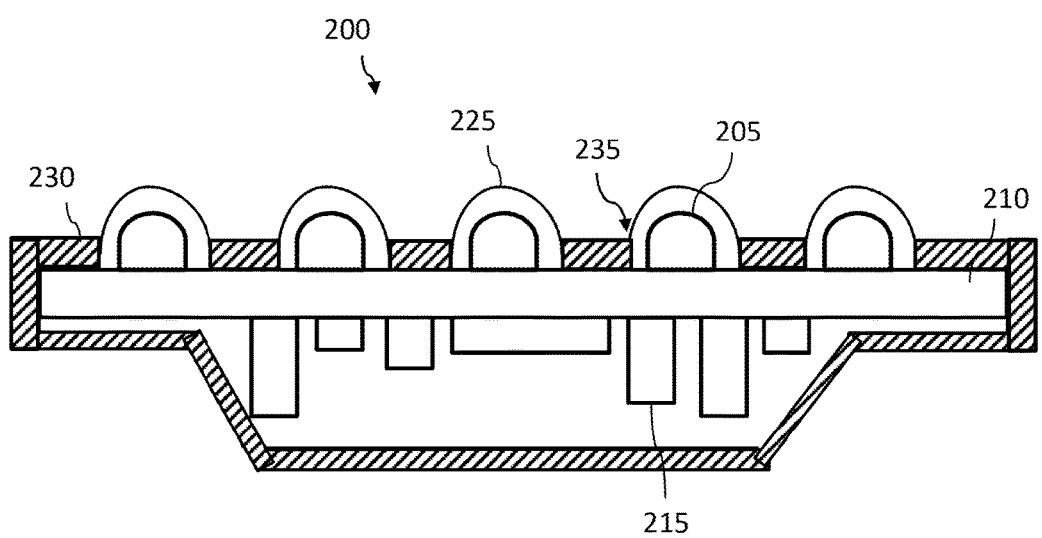
FIG. 4 is a schematic illustrating an LED signal module that can be implemented within one or more other embodiments of the present invention.

FIG. 4 is a schematic illustrating an LED signal module 200 that can be implemented within one or more other embodiments of the present invention. Several components of the LED signal module 200 are similar to the components of the LED signal module 100 shown in FIGS. 1-3 with the exception of the front element 230. Therefore a detailed description of each of the components is omitted.

The LED signal module 200 includes a plurality of LEDs 205 mounted on a PCB 210. LED driver components 215 are mounted on a side of the PCB 110 opposite the side having the LEDs 205 mounted thereon. The LEDs 205 are covered by a plurality of lenses 225. The LED signal module 200 further includes the front element 230 which includes a plurality of openings 235 for receiving each lens 225 therethrough.

The front element 230 encases (i.e., surrounds) the LED driver components 215 and secures and protects the LEDs 205, the PCB 210 and the LED driver components 215. Thus, the backshell 120 (shown in FIG. 1) is omitted in this embodiment. According to this embodiment, the lenses 225 can be fixedly secured by using alignment holes 135 and alignment pins 140 as shown in FIG. 2 or by press-fitting, or bi-injecting the lenses 225 and the front element 230.

Embodiments of the present invention provide the advantages of preventing overheating of components within the LED signal module and minimizing the sun phantom effect thereon. The LED signal module constructed in accordance with the embodiments also reduces costs by reducing the optical component content of the LED signal module.

This written description uses examples to disclose the invention including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An LED signal module comprising:
   a circuit board including a plurality of LEDs;
   a plurality of lenses, each lens corresponding to an LED of the plurality of LEDs; and
   a front element of an overmolded material including
   (i) a plurality of openings, each opening configured to receive a corresponding one of the plurality of lenses therethrough and
   (ii) an exterior surface having a textured pattern thereon formed of an opaque textured material, wherein the front element is configured to absorb light from external sources.

2. The LED signal module of claim 1, wherein the front element is formed by bi-injection with the plurality of lenses.

3. The LED signal module of claim 1, wherein the front element is formed of an overmolded plastic material.

4. The LED signal module of claim 1, wherein the front element is configured to absorb sun light to minimize the sun phantom effect.

5. The LED signal module of claim 1, further comprising LED driver components disposed on a side of the circuit board opposite the side having the LEDs mounted thereon, and configured to control operational states of the LEDs.

6. The LED signal module of claim 5, further comprising a backshell configured to encase the LED driver components.

7. The LED signal module of claim 5, wherein the LED driver components are components of an LED driver circuit disposed on the side of the circuit board opposite the side having the LEDs mounted thereon.

8. The LED signal module of claim 5, wherein the backshell comprises a plastic material.

9. The LED signal module of claim 8, wherein the each lens of the plurality of lenses is mounted to the circuit board.

10. The LED signal module of claim 9, wherein the circuit board comprises one or more alignment holes at at least one side of each LED;
   and the lens comprises one or more alignment pins to be fixedly inserted into the alignment holes.

11. The LED signal module of claim 8, wherein each lens is fixed in place over each LED by the front element.

12. The LED signal module of claim 11, wherein the front element further comprises a plurality of portions configured to wrap around opposite end surfaces of the backshell and to secure the backshell to the side of the PCB including the LED driver components mounted thereon, by a fastening component.

13. The LED signal module of claim 12, wherein the plurality of portions are L-shaped.

14. The LED signal module of claim 12, wherein each lens is press-fit to the circuit board by the front element.

15. An LED signal module comprising:
   a circuit board including a plurality of LEDs;
   a plurality of lenses, each lens corresponding to an LED of the plurality of LEDs, wherein each lens of the plurality of lenses is mounted to the circuit board; and
   a front element of a plastic material, the front element including:
      (i) a plurality of openings, each opening configured to receive a corresponding one of the plurality of lenses therethrough; and
      (ii) an exterior surface having a textured pattern thereon formed of an opaque textured material, wherein the front element is configured to absorb sun light to minimize the sun phantom effect.

\* \* \* \* \*